US006184304B1

(12) United States Patent
Pernisz

(10) Patent No.: US 6,184,304 B1
(45) Date of Patent: Feb. 6, 2001

(54) PHOTOLUMINESCENT MATERIAL FROM HYDROGEN SILSEQUIOXANE RESIN

(75) Inventor: Udo C. Pernisz, Midland, MI (US)

(73) Assignee: Dow Corning Corporation, Midland, MI (US)

(*) Notice: Under 35 U.S.C. 154(b), the term of this patent shall be extended for 0 days.

(21) Appl. No.: 09/356,874

(22) Filed: Jul. 19, 1999

Related U.S. Application Data

(62) Division of application No. 09/019,603, filed on Feb. 6, 1998, now Pat. No. 6,018,002.

(51) Int. Cl.$^7$ .......................... C04B 35/56; C09D 183/05; C03C 17/27; G02B 25/02
(52) U.S. Cl. ...................... 525/326.5; 525/332.7; 525/474; 524/79; 524/188; 524/268; 524/86; 524/3; 427/126; 427/397

(58) Field of Search ................ 525/326.5, 332.7, 525/474; 524/79, 188, 268, 863; 427/126, 397

(56) References Cited

U.S. PATENT DOCUMENTS 5,145,723 * 9/1992 Ballaance et al. ............... 427/397.7
5,837,364 * 11/1998 Zank .................................. 428/312.6

FOREIGN PATENT DOCUMENTS

0635554A2 * 1/1995 (EP).

* cited by examiner

Primary Examiner—David W. Wu
Assistant Examiner—Tanya Zalukaeva
(74) Attorney, Agent, or Firm—James L. De Cesare

(57) ABSTRACT

A photoluminescent material is prepared by preparing a gel from a solution of the resin in a solvent, and pyrolyzing the resin gel in oxygen by heating the gel to a temperature above approximately 400° C. for about two hours.

9 Claims, No Drawings

PHOTOLUMINESCENT MATERIAL FROM HYDROGEN SILSEQUIOXANE RESIN

CROSS-REFERENCE TO RELATED APPLICATIONS

This application is a division of application U.S. Ser. No. 09/019,603 filed Feb. 6, 1998, now U.S. Pat. No. 6,018,002.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to the preparation of a photoluminescent material from a hydrogen silsesquioxane resin.

BACKGROUND OF THE INVENTION

While the heat treatment of a hydrogen silsesquioxane resin has been described in the prior art, in for example, U.S. Pat. No. 4,756,977 (Jul. 12, 1988); U.S. Pat. No. 5,145,723 (Sep. 8, 1992); U.S. Pat. No. 5,370,903 (Dec. 6, 1994); U.S. Pat. No. 5,370,904 (Dec. 6, 1994); U.S. Pat. No. 5,372,842 (Dec. 13, 1994); U.S. Pat. No. 5,380,567 (Jan. 10, 1995); U.S. Pat. No. 5,403,748 (Apr. 4, 1995); and U.S. Pat. No. 5,693,565 (Dec. 2, 1997); as well as in two copending United States patent applications assigned to the same assignee as the present invention, namely U.S. Ser. No. 08/771,627 filed Dec. 20, 1996, and entitled "Method of Producing Low Dielectric Ceramic-Like Materials"; and U.S. Ser. No. 08/798,405 filed Feb. 7, 1997, and entitled "Method of Producing Coatings on Electronic Substrates"; it is believed that no skilled artisan has previously devised a process similar to the method described herein, nor have skilled artisans determined photoluminescence of a material based on a hydrogen silsesquioxane resin in the manner described herein. Furthermore, unlike U.S. Pat. No. 5,635,249 (Jun. 3, 1997), this invention does not require the addition of a phosphor filler to achieve a luminescent effect.

BRIEF SUMMARY OF THE INVENTION

This invention relates to the preparation of a strongly photoluminescent material by the heat treatment of a hydrogen silsesquioxane resin. The method described herein involves the steps of (i) pyrolyzing a hydrogen silsesquioxane (HSQ) resin in powder form in a crucible in oxygen, by rapidly heating the resin to a temperature above approximately 400° C. for several hours, generally for about two hours; or (ii) preparing a gel from a solution of the resin dissolved in a suitable solvent, and then pyrolyzing the resin gel in oxygen by heating it to a temperature above approximately 400° C. for about two hours.

If desired, the method can include an additional step of further pyrolyzing the photoluminescent material produced by methods (i) or (ii) above, by heating the photoluminescent material in a different gas, i.e. other than oxygen, to a temperature above approximately 400° C. for about two hours. Reactive gases such as ammonia and nitrous oxide, or an inert gas such as nitrogen, can be used in this step.

Photoluminescence of resulting materials can be observed in the visible part of the spectrum, predominately the blue region, upon excitation of converted materials with an ultraviolet (UV) light having a wavelength of, for example, 337 nanometer (nm).

As used herein, the term "rapidly heating" is intended to mean that heating is carried out such that the material melts on its exterior surface before the conversion or cure reaction occurs, i.e., ceramification. Typically, heating should be completed within about three minutes.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

According to the invention, the material employed is a preceramic silicon-containing resin, more particularly, a hydridosiloxane resin containing units of the formula $HSi(OH)_x(OR)_yO_{z/2}$. R is independently an organic group or a substituted organic group, which when bonded to silicon through the oxygen atom, forms a hydrolyzable substituent.

Suitable R groups include alkyl groups such as methyl, ethyl, propyl, and butyl; aryl groups such as phenyl; and alkenyl groups such as allyl or vinyl. The value of x is 0–2; y is 0–2; z is 1–3; and the sum of x+y+z is 3.

These resins may be (i) fully condensed hydrogen silsesquioxane resins $(HSiO_{3/2})_n$; (ii) resins which are only partially hydrolyzed, i.e., containing some ≡SiOR; and/or (iii) resins which are partially condensed, i.e., containing some ≡SiOH. In addition, the resin may contain less than about 10% of silicon atoms having either no hydrogen atoms or two hydrogen atoms, or oxygen vacancies, as well as ≡Si—Si≡ bonds, which can occur during their formation or handling.

Hydrogen silsesquioxane resins are ladder or cage polymers which generally conform to the structure depicted below.

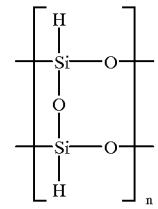

Typically, n has a value of four or more. By way of illustration, when n is four, a bond arrangement for a silsesquioxane cubical octamer is depicted below.

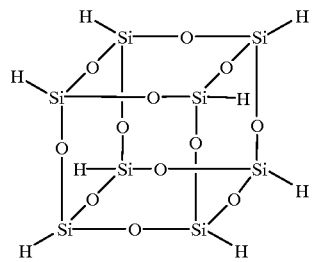

As the series is extended, i.e., n being five or more, double-stranded polysiloxanes of indefinitely higher molecular weight are formed, which contain regular and repeated crosslinks in their extended structure.

Hydrogen silsesquioxane resins and a method for their preparation are described in U.S. Pat. No. 3,615,272 (Oct. 26, 1971), which is incorporated herein by reference. According to the method in the '272 patent, nearly fully condensed hydrogen silsesquioxane resin containing up to 100–300 parts per million silanol (≡SiOH), can be prepared by hydrolyzing trichlorosilane (HSiCl$_3$) in a benzene sulfonic acid hydrate medium, washing with aqueous sulfuric acid, and subsequently washing with distilled water until neutral. The solution is filtered to remove insoluble material, and is then evaporated to dryness, leaving a solid resinous polymer in powder form.

U.S. Pat. No. 5,010,159 (Apr. 23, 1991), which is also incorporated herein by reference, teaches another method of hydrolyzing hydridosilanes that are dissolved in a hydrocarbon solvent with an aryl sulfonic acid hydrate medium to form the resin. A solid resinous polymer in powder form can be recovered by removing the solvent. The solvent can be removed by distilling off the solvent at atmospheric pressure to form a concentrate containing 40–80% of the resin, and removing the remaining solvent under vacuum and mild heat.

Other suitable resins are described in U.S. Pat. No. 4,999,397 (Mar. 12, 1991) including those resins produced by hydrolyzing an alkoxy or acyloxy silane in an acidic alcoholic medium according to Japanese Kokai Patents J59-178749 (Jul. 6, 1990), J60-86017 (May 15, 1985), and J63-107122 (May 12, 1988), all of which are incorporated by reference.

Solutions of the resinous polymer can be formed by simply dissolving or dispersing the preceramic silicon containing resin in a solvent or in a mixture of solvents. Some suitable solvents which can be employed by way of example are aromatic hydrocarbons such as benzene, toluene, and xylene; alkanes such as n-heptane, hexane, octane, and dodecane; ketones such as methyl ethyl ketone and methyl isobutyl ketone (MIBK); linear polydimethylsiloxanes such as hexamethyldisiloxane and octamethyltrisiloxane; cyclic polydimethylsiloxanes such as octamethylcyclotetrasiloxane and decamethylcyclopentasiloxane; esters such as butyl acetate and isoamyl acetate; or ethers such as diethyl ether and hexyl ether.

Generally, enough solvent is used to form the solutions, which typically range from a solids content of 10 to 85 weight percent of the resin. Gels can be prepared from these solutions by adding a small amount of a solvent that contains an OH group, such as methanol, ethanol, or isopropanol. A small quantity of water can also be used. In either case, typically, between $10^{-4}$ to $10^{-2}$ percent by volume of this additive are sufficient to cause gelation of the solution.

The powder form of the resin, and the resin gels referred to hereinafter in the examples, were prepared generally according to these procedures.

EXAMPLE

In a series of laboratory experiments, it was observed that a powder form of hydrogen silsesquioxane resin with a molecular weight distribution of about 2 to 100 kilodalton (kDa) showed a weak blue photoluminescence when excited with UV light at a wavelength of 337 nm obtained from a pulsed nitrogen laser.

When a gel of the hydrogen silsesquioxane resin was prepared from a solution of the hydrogen silsesquioxane resin in methyl isobutyl ketone, the gel also showed photoluminescence. The photoluminescence of the gel was somewhat stronger than the photoluminescence of the hydrogen silsesquioxane resin powder itself, and the photoluminescence of the gel had more color saturation in comparison to the photoluminescence of the hydrogen silsesquioxane resin powder itself. However, both the photoluminescence of the gel and the photoluminescence of the hydrogen silsesquioxane resin powder were bluish-green to the naked eye.

Upon conversion by pyrolysis of hydrogen silsesquioxane resin powder, and upon conversion by pyrolysis of the hydrogen silsesquioxane resin gel, in oxygen at 400° C., a deep blue aquamarine photoluminescence was observed that was stronger than the photoluminescence exhibited by the uncured species.

When the pyrolytic conversion of the hydrogen silsesquioxane resin gel was performed at 500° C. in oxygen, a material was obtained that exhibited a very strong blue photoluminescence compared to treatment of the hydrogen silsesquioxane resin gel at 400° C.

When the pyrolytic conversion of the hydrogen silsesquioxane resin gel was performed at 500° C. in nitrogen instead of oxygen, the material exhibited a similar, although somewhat less, strong blue photoluminescence compared to treatment of the hydrogen silsesquioxane resin gel at 400° C.

However, when the hydrogen silsesquioxane resin gel was converted at a temperature of 600° C. in oxygen, the material turned yellowish-brown, which is attributed to carbon formation from solvent residue, and the photoluminescent intensity decreased, compared to the photoluminescent intensity of the hydrogen silsesquioxane resin gel cured at 500° C.

The photoluminescent properties of several commercially available silicon containing compounds were also compared with the photoluminescent properties of materials prepared according to this invention, and it was found that hydrogen silsesquioxane resin gel (H-resin gel) according to this invention, and which had been pyrolyzed at 500° C., exhibited the strongest emission under identical excitation with UV light at 337 nm.

The following Table I provides a qualitative comparison of the emission intensity and coloration, i.e., the color hue, of the observed photoluminescence of the several materials which were examined. Materials prepared according to this invention are italicized for convenience in the comparison. In Table I, Ph indicates the phenyl group —C$_6$H$_5$, and Me indicates the methyl group —CH$_3$. Excitation was provided by the use of a pulsed N$_2$ laser, 337 nm, 2×10$^{14}$ photons/pulse.

TABLE I

| Material | Emission Intensity | Coloration, Hue |
|---|---|---|
| Dimethylsilane phenylmethylsilane copolymer PSS-120 [Me$_2$Si/PhMeSi]$_n$ | Medium | Whitish Green |
| Dimethylsilane phenylmethylsilane copolymer PSS-400 [Me$_2$Si/PhMeSi]$_n$ | Weak | Whitish Green |
| Pentaphenylcyclo pentasiloxane [PhHSiO]$_5$ | Medium | Lucid Whitish Blue |
| Octaphenylcyclo tetrasiloxane [Ph$_2$SiO]$_4$ | Weak | Lucid Whitish Blue |

TABLE I-continued

| Material | Emission Intensity | Coloration, Hue |
|---|---|---|
| H-resin gel in MIBK | Weak | Lucid Whitish Blue |
| Polymethylsilane [-Me$_2$Si-]$_n$ | Weak | Lucid Whitish Blue |
| Pyrolyzed H-resin gel (silica) 400° C., O$_2$ | Strong | Aquamarine Blue |
| CarboSil ® L-90 fumed silica | Weak | Aquamarine Blue |
| CarboSil ® EH-5 fumed silica | Weak | Aquamarine Blue |
| Hexaphenyl disilane Ph$_6$Si$_2$ | Strong | Deep Aquamarine Blue |
| MinSil ® 600 fused silica | Weak | Deep Aquamarine Blue |
| Polydiphenyl silane [-Ph$_2$Si-]$_5$ | Weak | Deep Aquamarine Blue |
| Hexaphenylcyclo trisiloxane [Ph$_2$SiO]$_3$ | Strong | Deep Navy Blue |
| Diphenylsilane diol Ph$_2$Si[OH]$_2$ | Weak | Deep Navy Blue |
| Diphenyl dimethoxy silane Ph$_2$Si[OMe]$_2$ | Weak | Deep Navy Blue |

In Table I, CarboSil® is a trademark of the Cabot Corporation, Tuscola, Ill.; and MinSil® is a trademark of Minco Products Incorporated, Minneapolis, Minn.

It was also determined that the following compounds exhibited no photoluminescence under conditions utilized in examining the compounds in Table I, i.e., phenyldichlorosilane PhHSiCl$_2$; octamethylcyclotetrasiloxane [Me$_2$SiO]$_4$; decamethylcyclopentasiloxane [Me$_2$SiO]$_5$; and dodecamethylcyclohexasiloxane [Me$_2$SiO]$_6$.

ADDITIONAL EXAMPLE

As an example of the emission characteristics of novel materials according to this invention, the emission spectrum of a hydrogen silsesquioxane resin, prepared from a hydrogen silsesquioxane resin gel pyrolyzed at 400° C. for three hours in air according to the above procedure, was measured in the near UV region of the electromagnetic spectrum (i.e., 200–400 nm), and in the visible region of the electromagnetic spectrum (i.e., 400–800 nm), at 77 K under excitation with a 300 nm light. The emission peaked broadly at about 430 nm, which is in the blue region of the visible spectrum. Scanning Electron Micrographs (SEM) showed that this photoluminescent material had a highly porous structure with particle size features well below the one micron (micrometer) range.

Such solid pyrolyzed hydrogen silsesquioxane resins are believed to constitute the only completely inorganic silicon containing compounds capable of providing photoluminescent properties equivalent to the photoluminescent properties of organic aromatic molecules. In addition, these materials emit light in the blue region of the visible spectrum which is not readily accessible by most compounds. Because of these benefits, the materials are useful in flat panel color displays for data processing and computer equipment.

FURTHER EXAMPLE

This example demonstrates an increase by two orders of magnitude over the phosphorescence that was observed for an uncured hydrogen silsesquioxane resin. It also shows the identification of two different emission centers in the oxygen-cured hydrogen silsesquioxane resin by means of the position of their phosphorescence maxima and decay time constants.

Thus, a quantity of a hydrogen silsesquioxane resin was cured by exposing it to a temperature of 420° C. in an oxygen atmosphere for 2.5 h. The procedure consisted of loosely packing a powder form of hydrogen silsesquioxane resin into a quartz crucible, and then placing the crucible into a furnace three centimeter above its bottom wall which was at the stated temperature, as the furnace was being purged with oxygen. When the sample was removed from the furnace, its surface was very smooth, as if it had molten, and it had a very white appearance. Beneath its surface, the interior of the hydrogen silsesquioxane resin sample was very porous and loosely packed. In its center, it had a fluffy portion which appeared yellowish in color. When the sample was irradiated with 337 nm light, the compacted material exhibited very strong blue photoluminescence which was much stronger than the corresponding uncured hydrogen silsesquioxane resin. The fluffy interior portion, however, showed a whitish-yellowish clearly non-blue photoluminescence under the same excitation conditions. The fluffy interior portion of the material did not phosphoresce, whereas the compact portion at the surface of the material clearly showed an extended greenish component which had a 2 to 3 s (second) lifetime at room temperature.

A phosphorescence spectrum was obtained by exciting the sample at a wavelength of 320 nm with a flash lamp and measuring the phosphorescence intensity at a delay time of 50 µs (microsecond) after the triggering of the lamp. The phosphorescence showed a strong maximum at 470 nm for the cured material, while the uncured hydrogen silsesquioxane resin was essentially devoid of any phosphorescence under similar conditions. Since the converted hydrogen silsesquioxane resin exhibited phosphorescence at room temperature with a maximum ranging from 470 nm to 500 nm, and the unconverted hydrogen silsesquioxane resin exhibited no significant phosphorescence, it is believed that the conversion process produces a new electron state, characterized by a long-lived luminescence.

The time constant of this luminescence radiation was determined from the decay of the emitted intensity as a function of time after the excitation light pulse, and the value obtained at room temperature was 40 ms (millisecond). A second luminescing center was identified in the cured hydrogen silsesquioxane resin material when it was excited at 360 nm instead of at 320 nm. Under these conditions, the emission maximum was found at a wavelength of 560 nm, and the lifetime of this center was 15 ms.

The Table II below summarizes these results.

TABLE II

Phosphorescence of Cured Hydrogen Silsesquioxane Resin
(delay time 50 microsecond, measured at room temperature)

| excitation wavelength | λexec | [nm] | 320 | 360 |
|---|---|---|---|---|
| excitation energy | hv | [eV] | 3.9 | 3.4 |
| emission maximum | λe, mx | [nm] | 495 | 560 |
| decay time constant | λph | [ms] | 40 | 15 |

ANOTHER EXAMPLE

This example demonstrates the existence and quantification of long time constants of visible phosphorescence for an oxygen cured hydrogen silsesquioxane resin.

Thus, measurements were carried out to determine the phosphorescence decay time constants for an oxygen cured hydrogen silsesquioxane resin prepared from a hydrogen silsesquioxane resin gel, with the goal of identifying the number and spectral characteristics of the emission centers. A full emission spectrum was recorded after excitation at $\lambda=280$ nm at increasing delay times after the excitation flash. It established that the spectral distribution did not change between 0.1 ms and 2 s; and that the emission maximum occurs at a wavelength of $\lambda=438$ nm. Otherwise, the spectral distribution consisted of a wide featureless band tailing off towards 650 nm. A semilogarithmic plot of the phosphorescence intensity at 438 nm versus time at long delay times after excitation revealed that the emission process is characterized by more than one time constant, and that the decay mechanism therefore cannot be described by a single electronic state. Rather, a short time constant of $\tau_1=90.7$ μs and a long time constant of $\tau_2=3.44$ s describe the experimental data more accurately, as seen in the semilogarithmic plot of phosphorescence intensity at the emission maximum ($\lambda=438$ nm) versus delay time after excitation at $\lambda=280$ nm. The plot revealed that at long times, i.e., t>500 ms, the data points fell on a straight line indicating exponential decay. For shorter times, a different decay process dominates. The data were fit to a double exponential without offset over the full temporal range with a correlation factor r=0.9995. The large value of $\tau_2=3.44$ s confirmed visual observations of a phosphorescence that continued for several seconds after the end of excitation with a 337 nm pulsed nitrogen laser.

Other variations may be made in the compounds, compositions, and methods described herein without departing from the essential features of this invention. The forms of invention as shown in the examples are representative only and not intended as limitations on their scope as defined in the appended claims.

What is claimed is:

1. The method of preparing a photoluminescent material comprising the step of (i) preparing a gel from a solution of a hydrogen silsesquioxane resin in a solvent, and heating the gel in oxygen by heating the gel to a temperature above approximately 400° C. for about two hours.

2. A method according to claim 1 in which the hydrogen silsesquioxane resin has a molecular weight of about 2 to 100 kilodalton.

3. A method according to claim 1 in which the solvent is selected from the group consisting of aromatic hydrocarbons, alkanes, ketones, cyclic polydimethylsiloxanes, esters, and ethers.

4. A method according to claim 3 in which the gel is prepared by dissolving or dispersing the resin in a solvent or a mixture of solvents to form the solution; and adding to the solution another solvent selected from the group consisting of water, methanol, ethanol, and isopropanol.

5. A method according to claim 1 in which the resin is a hydridosiloxane containing units of the formula $HSi(OH)_x(OR)_yO_{z/2}$ wherein R is independently an organic group or a substituted organic group, which when bonded to silicon through the oxygen atom forms a hydrolyzable substituent; x is 0–2; y is 0–2; z is 1–3; and the sum of x+y+z is 3.

6. A method of claim 5, in which R is selected from the group consisting of alkyl, aryl and alkenyl group.

7. A method according to claim 1 including an additional step of (ii) further pyrolyzing the photoluminescent material prepared in (i) by heating the photoluminescent material in a different gas to a temperature above approximately 400° C. for about two hours.

8. A method according to claim 7 in which the different gas is ammonia or nitrous oxide.

9. A method according to claim 7 in which the different gas is nitrogen.

* * * * *